(12) United States Patent
Mesher et al.

(10) Patent No.: US 7,572,382 B2
(45) Date of Patent: *Aug. 11, 2009

(54) RECYCLING HYDROCARBON HYDRAULIC STIMULATION FLUID

(75) Inventors: Shaun T. Mesher, Calgary (CA);
Amanda G. Jarvis, Canterbury (GB);
Robin Tudor, Black Diamond (CA)

(73) Assignee: Synoil Fluids Holdings Inc., Calgary, Alberta (CA)

( * ) Notice: Subject to any disclaimer, the term of this patent is extended or adjusted under 35 U.S.C. 154(b) by 157 days.

This patent is subject to a terminal disclaimer.

(21) Appl. No.: 11/555,149

(22) Filed: Oct. 31, 2006

(65) Prior Publication Data

US 2007/0277977 A1    Dec. 6, 2007

(30) Foreign Application Priority Data

Jun. 5, 2006    (CA) .................................... 2550382
Oct. 25, 2006    (CA) .................................... 2566070

(51) Int. Cl.
*B01D 17/025*    (2006.01)
*B01D 17/05*    (2006.01)

(52) U.S. Cl. .................... 210/708; 166/267; 166/305.4; 210/694; 210/712; 210/714; 210/724; 210/737; 210/799

(58) Field of Classification Search .................. 210/708
See application file for complete search history.

(56) References Cited

U.S. PATENT DOCUMENTS

| | | | | |
|---|---|---|---|---|
| 4,191,651 A * | 3/1980 | Cheysson et al. | ............ | 210/265 |
| 4,436,635 A * | 3/1984 | Abrams et al. | .............. | 210/806 |
| 4,701,271 A * | 10/1987 | Thach et al. | ................. | 507/277 |
| 5,093,006 A * | 3/1992 | Kalnins | ...................... | 210/704 |
| 5,354,477 A * | 10/1994 | Rush | .......................... | 210/708 |
| 5,567,318 A * | 10/1996 | Beall | .......................... | 210/691 |
| 5,792,365 A * | 8/1998 | Torini | ......................... | 210/714 |
| 5,976,366 A * | 11/1999 | Hwang et al. | ................ | 210/188 |
| 6,491,824 B1 * | 12/2002 | Lin et al. | ..................... | 210/666 |
| 6,875,728 B2 * | 4/2005 | Gupta et al. | ................. | 507/240 |
| 6,913,080 B2 * | 7/2005 | Lehman et al. | ........... | 166/252.3 |
| 7,314,850 B2 * | 1/2008 | Taylor et al. | ................. | 507/238 |
| 2004/0200616 A1 * | 10/2004 | Chatterji et al. | ............. | 166/267 |

* cited by examiner

*Primary Examiner*—Peter A Hruskoci
(74) *Attorney, Agent, or Firm*—Bennett Jones LLP

(57) ABSTRACT

Hydrocarbon stimulation fluids are often used to increase the permeability and productivity of oil and gas reservoirs. The fluid itself is made up of a mixture of hydrocarbons and various chemicals designed to induce gel formation and gel breaking. The successful removal of these chemicals from the fluid has been achieved, through a process of acid-washing, mixing with a settling agent, centrifugation and filtration. This will allow the fluid to be re-used many times for further fracturing processes.

28 Claims, 2 Drawing Sheets

RECYCLING HYDROCARBON HYDRAULIC STIMULATION FLUID

BACKGROUND

Stimulation fluids are used to create additional permeability in oil and gas reservoirs. This is achieved by pumping the fluid (hydrocarbon or water) down hole. While this is happening three chemicals are mixed at the surface and blended into the fluid to create viscosity, also known as a gel state. The three main chemicals contained in the used fracturing fluid are, in general, as described below. The gelling agent—typically a phosphate ester which is slightly acidic, the activator—typically an iron or aluminum complex which may be a Lewis acid, and the breaker—typically a basic metal oxide.

The viscous fluid is pumped at high rates down hole and is forced into the hydrocarbon reservoir under high pressures. Once the fluid pressure is greater than the rock pressure, the fluid creates a fracture in the rock and flows into the fracture. As this is happening, proppant, usually sand, is then added and pumped downhole to stabilize the fracture and provide porosity.

As the fracture stimulation ends, the breaker chemical in the fluid begins to degrade (or break) the gel, which brings the viscosity down to pre-gel levels. Once the hydrocarbon fluid is broken, the fluid (termed flow-back) is then brought to surface and subsequently sent to oil recyclers for clean-up and sold back into the crude oil system.

Recycling of hydrocarbon fracturing fluids has been limited. Typically a company will reuse the fluid and increase the concentration of all the chemicals used to create and break the gel. This can occur only a limited number of times before the fluid becomes too unstable to create a usable gel system. Previous industrial efforts have used lime to remove residual gels at surface that have not broken. Heating and filtering have also been used to clean the hydrocarbon flow back and remove any solid particles such as sand and clay.

SUMMARY

There is provided a method of recycling used hydrocarbon fracturing fluid, the hydrocarbon fracturing fluid comprising a gelling agent. The gelling agent is a type of chemical commonly used in hydrocarbon fracturing fluid to give the fluid a high viscosity. The hydrocarbon fracturing fluid is contacted with a settling agent to separate the gelling agent from the hydrocarbon fracturing fluid. The settling and gelling agents are then removed from the hydrocarbon fracturing fluid to produce a recycled hydrocarbon fracturing fluid. In one embodiment, the hydrocarbon is contacted with a settling agent to react the gelling agent. This produces a hydrocarbon fracturing fluid containing a mixture of a hydrocarbon phase and a settling agent phase containing the reaction products of the settling agent and the gelling agent. The mixture is centrifuged, and the settling agent phase is removed from the hydrocarbon phase, producing a recycled hydrocarbon fracturing fluid. In another embodiment, the settling agent is clay or activated charcoal.

In another embodiment of a method of recycling used hydrocarbon fracturing fluid, the hydrocarbon fracturing fluid contains activator, breaker and gelling agent chemicals. The hydrocarbon fracturing fluid is contacted with an aqueous acid, but only when the pH of the hydrocarbon fracturing fluid is above the pH at which gelling occurs. The amount of aqueous acid used must be large enough to react the aqueous acid with the activator and breaker chemicals. This produces a hydrocarbon fracturing fluid with a hydrocarbon phase and an aqueous phase containing reaction products of the aqueous acid and the activator and breaker chemicals. In addition, the amount of aqueous acid must be less than the amount of aqueous acid necessary to cause the hydrocarbon fracturing fluid to form a gel is used. The aqueous phase is then separated from the hydrocarbon phase to produce recycled hydrocarbon fracturing fluid. Various others aspects of these processes are also described and claimed here.

BRIEF DESCRIPTION OF FIGURES

Embodiments will now be described with reference to the figures, in which like reference characters denote like elements, by way of example, and in which.

DETAILED DESCRIPTION

Removal of all three main gellant system chemicals in a hydrocarbon fracturing fluid, including the activator, breaker, and gelling agent, is described. This is accomplished by coupling two main processes. The first process involves the addition of aqueous acid to remove most of the activator and breaker chemicals, followed by the removal of the aqueous layer. The second process involves the addition of a settling agent, followed by separation, as for example by centrifugation and filtration through clay. The second process removes most of the gelling agent from the hydrocarbon fracturing fluid. These processes individually, and also collectively, make the hydrocarbon fracturing fluid reusable to fracture with. It should also be noted that the arrangement of these processes can be in any order, and each process may be repeated a number of times to ensure that the hydrocarbon fracturing fluid is effectively reusable.

Figure 1:
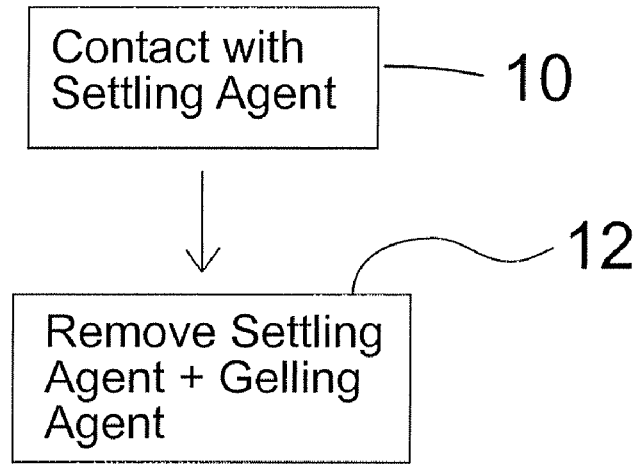
FIG. 1 is a flow diagram of an embodiment of a method for recycling used hydrocarbon fracturing fluid using a settling agent.

FIG. 1 describes an embodiment of a method for recycling used hydrocarbon fracturing fluid containing a gelling agent. This method includes contacting the used hydrocarbon fracturing fluid with a settling agent, shown in step 10. The settling agent is a chemical that acts to remove the gelling agent from solution, and functions by separating the gelling agent from the used hydrocarbon fracturing fluid. In addition, the settling agent may cause the gelling agent to settle out of solution. The settling agent and the gelling agent are then removed from the used hydrocarbon fracturing fluid in step 12, as for example by draining, skimming or filtration. A recycled hydrocarbon fracturing fluid is produced upon removal of the gelling and settling agents from the used hydrocarbon fracturing fluid. The settling agent may function by reacting with the gelling agent to produce a hydrocarbon fracturing fluid containing a mixture of a hydrocarbon phase and a settling agent phase. Contained in the settling agent phase are the reaction products of the settling agent and the gelling agent. Removing the settling and gelling agents can be accomplished by removing the settling agent phase from the hydrocarbon phase. This may be accomplished by centrifuging the mixture of a hydrocarbon phase and a settling agent phase and removing the settling agent phase from the hydrocarbon phase, as for example by draining, skimming or filtration.

Figure 2:
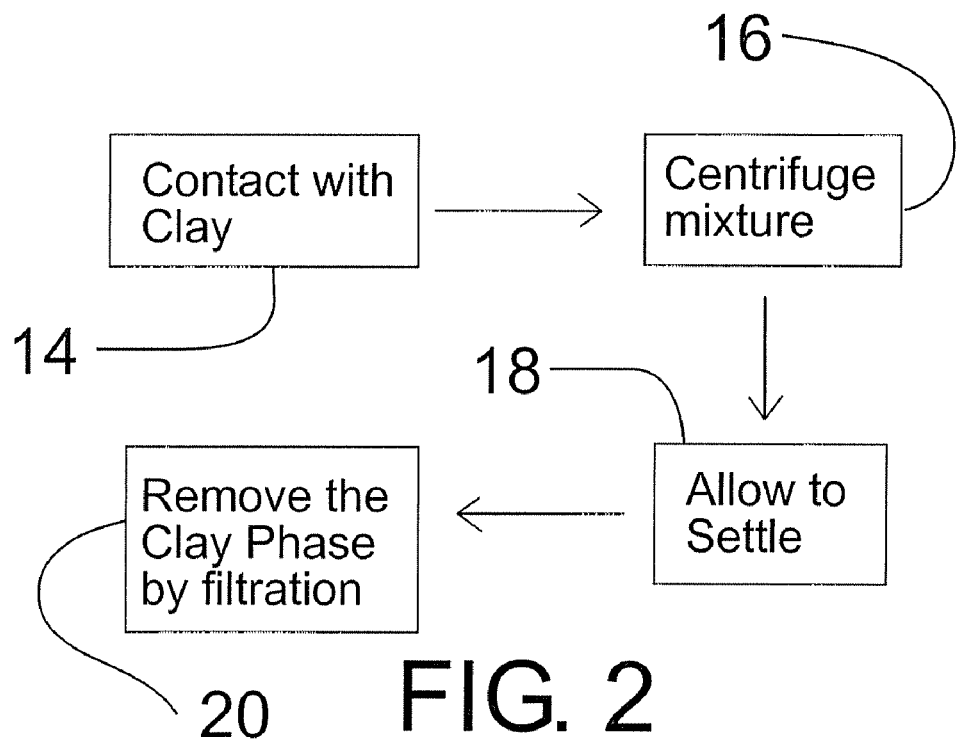
FIG. 2 is a flow diagram of a further embodiment of a method for recycling used hydrocarbon fracturing fluid using clay.

A further embodiment of a method for recycling used hydrocarbon fracturing fluid involves the use of clay as the settling agent, as shown in FIG. 2. This procedure may be used to remove any gelling agent present in the fluid. The gelling agent generally consists of a phosphate ester. Other substances, such as activated charcoal may be used instead of clay. Used hydrocarbon fracturing fluid containing a gelling agent is contacted with clay in step 14. The clay may react with the gelling agent. Typically, the used hydrocarbon fracturing fluid will be contained within a large tank in step 14. The tank may be provided with a means of mixing and heating the fluid contained within. The addition of the clay in step 14 may be accomplished by a number of methods, one of which involves the direct addition of the clay into the tank, followed by mixing and heating. Addition of claim may be accomplished by adding the clay from a hopper.

There are a few other methods by which the clay may be added. The tank may contain a pipe that leads from the tank and back into the tank. This will allow the contents of the pipe to be pumped back into the tank itself. The clay may be added directly into the pipe by some suitable addition means, such as from a hopper. By pumping this fluid back into the tank, this will ensure that the clay-containing fluid is well mixed. Alternatively, the tank may have a design similar to that of a polymer addition tank, with an auger at the bottom of the tank. The clay can then be added directly into the tank from a hopper, and upon turning the auger, this would ensure that the fluid in the tank is well mixed with the clay.

It may be important that the hydrocarbon fracturing fluid and clay mixture is very well mixed in order for the clay to accomplish its purpose. The addition of the clay will produce a hydrocarbon fracturing fluid containing a mixture of a hydrocarbon phase and a clay phase containing in one embodiment the reaction products of the clay and the gelling agent. This mixture forms a slurry of hydrocarbon liquid and finely dispersed clay particles. Performing this step may be done by heating the mixture to a suitable temperature range, over a suitable length of time. In one embodiment, this means heating to the flash point of the hydrocarbon fracturing fluid, as for example 40° C., over a period of 30 minutes. Higher temperatures may be preferable to lower temperatures, but it is not desirable to exceed the flash point of the hydrocarbon fracturing fluid.

The clay added to the hydrocarbon fracturing fluid may be one or more of montmorillonite k10, fulcat 435, fulcat 220, Wyoming gel, zeolite cage T408, diatomaceous earth, Big Horn CH200 Grade Bentonite, salt gel, and natural gel, although other clays may be used. Fulcat 435 or montmorillonite k10 may in particular be used. In one embodiment, the clay may be added by weight in an amount of 0.5%-4% of the hydrocarbon fracturing fluid, as for example 3.4%. Alternative, the clay may be added in another appropriate amount.

Referring to FIG. 2, in one embodiment, upon the addition of the clay and after mixing and heating, the mixture of the hydrocarbon phase and the clay phase is centrifuged in step 16. The mixture of the hydrocarbon phase and the clay phase is then allowed to settle for a suitable length of time in step 18. The mixture can then be filtrated in step 20. The purpose of settling step 18 is to allow for additional separation between the clay particles and the hydrocarbon fluid to occur prior to the filtration carried out in step 20. If the mixture is not allowed to settle for a long enough amount of time, the filtration may be less effective in separating the two phases. The settling time in step 18 may include settling overnight. If the time is available, longer settling time may result in more settling. Alternatively, other methods of separation may be employed instead of the sequence shown in FIG. 2 involving centrifugation, settling, and filtration. Settling alone may be sufficient, followed by separating by removal of one of the two phases. Centrifuging equipment is heavy, and may not be available on site. Thus, centrifuging will not always be used, but can assist in the separation process if a centrifuge is present. Centrifuging may be particularly useful where a significant amount of dissolved gas is present in the hydrocarbon fracturing fluid, since in that case the centrifuge will assist in removing the dissolved gas and reduce the Reid vapour pressure of the fluid.

Upon settling, the clay phase is removed from the hydrocarbon phase, as shown in step 20. This removal may be accomplished by filtering the clay phase from the hydrocarbon phase to produce a recycled hydrocarbon fracturing fluid. Alternatively, other suitable methods of separation may be used in step 20 other than filtration. The filtration step may include filtering the mixture through a filter having a pore size of less than or equal to 1.5 μm diameter. Alternatively, the filtration step may include filtering the mixture through a layer of clay. The filtration of step 20 may be repeated a number of times. In addition, the entire procedure or any part of the procedure shown in FIG. 2, including the addition of clay in step 14, followed by centrifugation in step 16, settling in step 18 and filtering in step 20 may be repeated any number of times.

In another embodiment of this method, used hydrocarbon fracturing fluid, containing activator and breaker chemicals, is contacted with an aqueous acid. The addition of the aqueous acid is effective in the removal of any of the activator and breaker chemicals present in the used hydrocarbon fracturing fluid. Because the hydrocarbon fracturing fluid contains a basic metal oxide that is used as a breaker chemical to break the gel reversibly, if the pH of the hydrocarbon fracturing fluid is too low, then the fluid will re-gel. If clay is added whilst the hydrocarbon fracturing fluid is in a gel state, centrifuging and filtering may not be effective in recycling the hydrocarbon fracturing fluid. Therefore, care must be taken with the addition of the acid, and the used hydrocarbon fracturing fluid should only be contacted with the aqueous acid when the pH of the used hydrocarbon fracturing fluid is above the pH at which gelling occurs. This pH is typically a pH of 4. The aqueous acid reacts with the activator and breaker chemicals to produce a mixture with a hydrocarbon phase and an aqueous phase containing reaction products of the aqueous acid and the activator and breaker chemicals.

Figure 3:
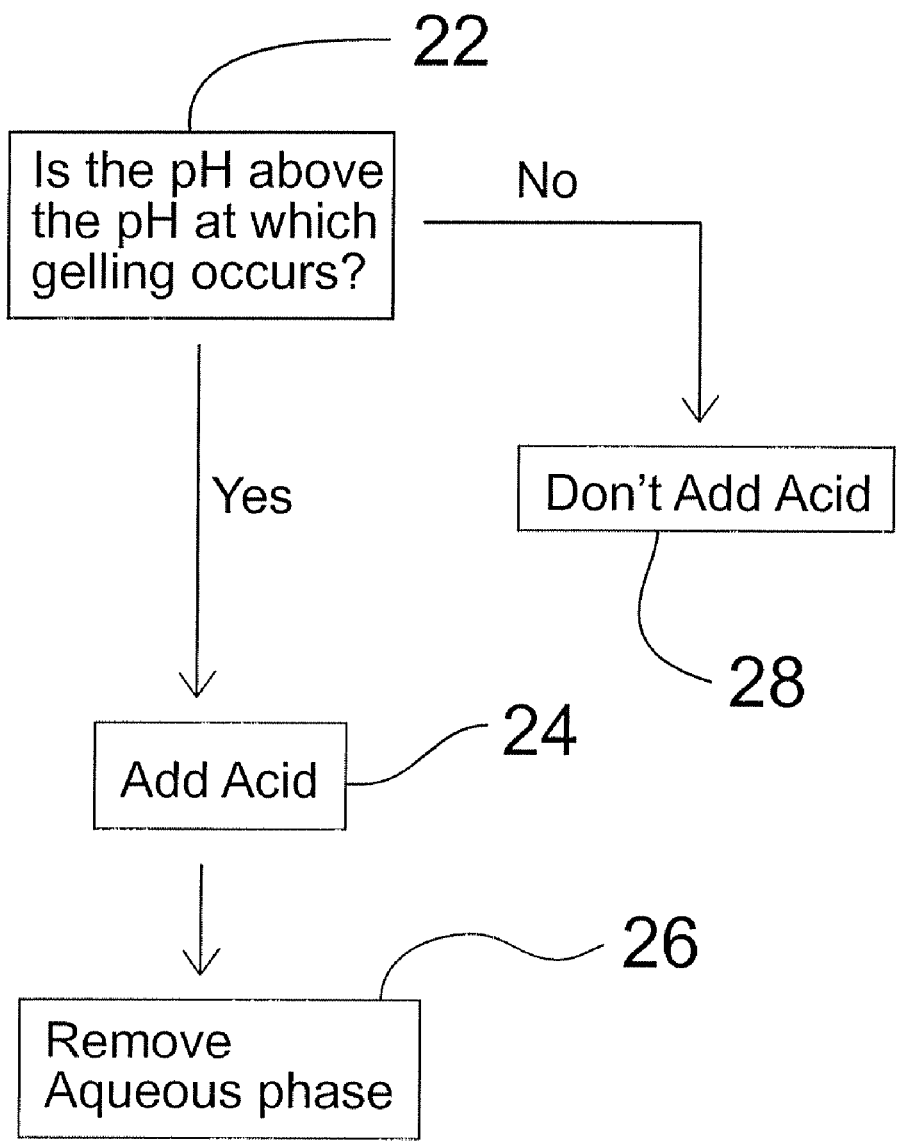
FIG. 3 is a flow diagram of another embodiment of a method for recycling used hydrocarbon fracturing fluid using aqueous acid.

In another embodiment of this method, described in FIG. 3, used hydrocarbon fracturing fluid can be contacted with an appropriate amount of the aqueous acid. In step 22, the pH of the used hydrocarbon fracturing fluid is taken, and it is decided whether or not to add aqueous acid to treat the fluid. The appropriate amount of the aqueous acid must be an amount that is less than the amount that would be large enough to cause the used hydrocarbon fracturing fluid to form a gel. Typically a gel will reform in used hydrocarbon fracturing fluid if the pH is at or below 4. This means that an amount of acid that would be large enough to cause the used hydrocarbon fracturing fluid to re-gel would be an amount that would bring the pH of the volume of used hydrocarbon fracturing fluid being recycled down to or below a pH of 4. An appropriate amount of aqueous acid to add is preferably less than or equal to adding an amount by weight of 5% of the used hydrocarbon fracturing fluid. In general, it is desirable not to add too much water to the system, so that additional amounts of aqueous acid may not be useful. If it is deemed that acid is to be added then the used hydrocarbon fracturing fluid is contacted with acid, as shown in step 24. In one embodiment, the used hydrocarbon fracturing fluid is contacted with aqueous acid in an amount by weight of the used hydrocarbon fracturing fluid between 0.5%-5%, preferentially between 0.5%-2%. If any gel is re-formed in the used hydrocarbon fracturing fluid, it may be broken by the addition of caustic.

The aqueous acid may comprise one or more of: phosphoric acid, ortho-phosphoric acid, pyro-phosphoric acid, hydrochloric acid, sulfuric acid, and sulfamic acid. For example, the aqueous acid may be 85% phosphoric acid, although other acids, such as organic acids, may also be used. The aqueous acid may comprise a concentrated acid, such as 85% phosphoric acid, with water added. An example of such an aqueous acid would be to use 0.2 ml, of 85% phosphoric acid along with 0.8 ml of water for every 1 ml of the aqueous acid.

Contacting the hydrocarbon fracturing fluid with the aqueous acid in step 24 of FIG. 3 should occur while mixing and heating the mixture of the hydrocarbon phase and the aqueous phase at appropriate temperatures, for an appropriate amount of time. In one embodiment, this step is carried out at a temperature between 30° C. and 40° C., and over a length of time of between 30 minutes and 150 minutes.

Referring to FIG. 3, after the used hydrocarbon fracturing fluid is contacted with the aqueous acid in step 24, the aqueous phase is removed from the hydrocarbon phase in step 26. Removal of the aqueous phase may be accomplished by draining the aqueous phase. Other separation techniques may be used, such as filtering, but draining is sufficiently effective. The aqueous phase may be disposed of in conventional manner, for example by downhole injection. Removal of the aqueous phase in step 26 produces a treated hydrocarbon fracturing fluid, which may be reused in a fracturing process, or further recycled. After acid treatment, the activator may be reduced by 99.96% and the breaker may be reduced by 99.93%. If it is deemed in step 22, that acid should not be added to the hydrocarbon fracturing fluid, then step 28 may be carried out. This step involves the addition of no acid, and the hydrocarbon fracturing fluid can then be processed according to the method detailed in FIG. 2. The sequence shown in FIG. 3, may be carried out prior to or after the sequence of contacting the hydrocarbon fracturing fluid with clay shown in FIG. 2. In addition, the sequence shown in FIG. 3 may be repeated any number of times. After treatment with acid and clay, levels of phosphorus (gelling agent), magnesium (breaker), and iron (activator) may be reduced by up to 99.3%, 99.995%, and 99.995%, respectively.

In one embodiment, the hydrocarbon fracturing fluid is heated prior to being contacted with aqueous acid, clay or activated charcoal. Heating the hydrocarbon fracturing fluid is accomplished by heating to a suitable temperature over a suitable amount of time in order to reduce the Reid Vapor Pressure to below 7 kPa. This evaporates the most volatile compounds, and makes the hydrocarbon fracturing fluid safer to work with. In one embodiment, this may be accomplished by heating to 40° C. over a course of 30 minutes, although other temperatures and lengths of time may be used.

Another embodiment of this process comprises recycling a hydrocarbon fracturing fluid containing activator, breaker and gelling agent chemicals. The hydrocarbon fracturing fluid is contacted with an aqueous acid when the pH of the hydrocarbon fracturing fluid is above the pH at which gelling occurs. Contacting the hydrocarbon fracturing fluid may comprise using aqueous acid to react with the activator and breaker chemicals. This produces a hydrocarbon fracturing fluid with a hydrocarbon phase and an aqueous phase containing reaction products of the aqueous acid and the activator and breaker chemicals. Contacting should only be done using an amount of aqueous acid that is less than the amount of aqueous acid necessary to cause the hydrocarbon fracturing fluid to form a gel. Typically this means that, in the case where a hydrocarbon fracturing fluid will gel at a pH of 4, aqueous acid is added to the hydrocarbon fracturing fluid only if the pH of the hydrocarbon fracturing fluid is 2 or more pH units above a pH of 4. If the pH of the hydrocarbon fracturing fluid satisfies the conditions where it is deemed aqueous acid may be added, then the aqueous acid is added to the hydrocarbon fracturing fluid until the pH drops to a value that is greater than but not equal to 4. An example of this pH would be 4.5. The amount of aqueous acid to be added can be determined experimentally, and in one embodiment is less than 5% by weight of the hydrocarbon fracturing fluid.

If aqueous acid has been added to the hydrocarbon fracturing fluid, the next step comprises separating the aqueous phase from the hydrocarbon phase to produce recycled hydrocarbon fracturing fluid. Separating may mean any method of separation, although in one embodiment the method used is filtration. This may be accomplished by filtering the mixture of the hydrocarbon phase and the aqueous phase through clay. Alternatively, the mixture can be filtered through a filter having a pore size less than or equal to 1.5 μm in diameter. Either filtration method mentioned, or both, may be used, and in any order or coupled together. Any step in this embodiment may be repeated a number of times to ensure that the resulting hydrocarbon fracturing fluid is adequately recycled. In addition, the addition of a settling agent may be coupled to this embodiment, as is described in detail in the earlier described embodiments of a method for recycling hydrocarbon fracturing fluid.

A further embodiment of a method for recycling used hydrocarbon fracturing fluid involves recycling hydrocarbon fracturing fluid which contains a gelling agent. The hydrocarbon fracturing fluid is contacted with a settling agent to react the gelling agent. This produces a hydrocarbon fracturing fluid containing a mixture of a hydrocarbon phase and a settling agent phase containing the reaction products of the settling agent and the gelling agent. The settling agent phase is then removed from the hydrocarbon phase to produce recycled hydrocarbon fracturing fluid. The settling agent comprises a chemical that acts to remove the gelling agent chemical from solution, which may be accomplished by causing the gelling agent to settle out of solution. The settling agent phase is removed from the hydrocarbon phase by first centrifuging the mixture of a hydrocarbon phase and a settling agent phase. After centrifugation, the settling agent is removed by any number of conventional separation methods, including filtration. The settling agent may comprise a clay. Alternatively, the settling agent may comprise activated charcoal.

Experimental

A test procedure was carried out as follows: A 200 ml sample of used SF-800 hydrocarbon fracturing fluid for the tests shown in the first table following and TG-740 fracturing fluid for the tests shown in the second table following (both fluids being obtained through SynOil Fluids, Calgary, Alberta. Canada) were stirred, heated to 40° C. and stirred for 30 minutes. Various chemicals as indicated below in the tables were added before the stirring took place. The treated hydrocarbon fluid was then filtered and any aqueous layers separated. The hydrocarbon fluid was analyzed by ICP and the ppm levels of various metals recorded. The phosphate gel is characterized by the phosphate metal levels, the breaker is characterized by the magnesium metal levels and the activator is characterized by the iron metal levels. All results are reported in ppm.

| Levels of metals (ppm) | P | Mg | Fe |
|---|---|---|---|
| 1. Untreated used SF-800 | 112 | 64 | 250 |
| 2. Heat + filter (1 µm filter) | 63 | 4.4 | 50 |
| 3. Heat + filter (montmorillonite) | 30 | 0.6 | 30 |
| 4. Heat + 1% H3PO4 + filter (1 µm) | 55 | 0.2 | 0.6 |
| 5. Heat + 1% H3PO4 + filter (montmorillonite) | 21 | 0.05 | 0.4 |
| 6. Heat + 0.9% H3PO4 + filter (montmorillonite) | 22 | 0.05 | 0.1 |
| 7. Heat + 1% HCl (35%) + filter (µm) | 56 | 1.7 | 12 |
| 8. Heat + 0.7% H3PO4 + filter (montmorillonite) | 19 | 0.1 | 9.6 |
| 9. Heat + 0.5% H3PO4 + filter (montmorillonite) | 14 | 0.05 | 0.2 |
| 10. Heat + 0.1% H3PO4 + filter (montmorillonite) | 6 | 1.9 | 0.7 |
| 11. Heat + 0.9% H3PO4 + filter (0.45 µm) | 98 | 7.3 | 33 |
| 12. Heat + 1% H3PO4 + filter (diatomaceous earth) | 137 | 23 | 108 |
| 13. Heat + 0.9% H3PO4 + filter (activated charcoal) | 162 | 11 | 33 |
| 14. Heat + 0.9% H3PO4 + filter (0.45 µm) | 153 | 9.7 | 32 |
| 15. Re-filter 14 + filter (0.45 µm) | 150 | 10 | 31 |
| 16. Re-filter 15 + filter (0.45 µm) | 118 | 5.5 | 14 |
| 17. Heat + 1% sulfamic acid + filter (montmorillonite) | 42 | 4.1 | 84 |
| 1. Untreated used TG-740 | 227 | 92 | 525 |
| 2. Heat + filter (1 µm filter) | 196 | 6.9 | 53 |
| 3. Heat + filter (1 µm) + filter (montmorillonite) | 20 | 0.2 | 5.7 |

A further test procedure is as follows: A 200 ml sample of used SF-740 (obtained through SynOil Fluids, Calgary, Alberta Canada) fracturing fluid and phosphoric acid 85% (0.2) and $H_2O$ (0.8 ml) was heated to 40° C. and stirred for 30 minutes. The water layer was removed. Clay (5 g) was added and the reaction stirred for an additional 30 minutes at 40° C. The mixture was then centrifuged. The centrifuged liquid was then filtered. The hydrocarbon fluid was analyzed by ICP and the ppm levels of various metals recorded. The gelling agent is characterized by the phosphate metal levels, the breaker is characterized by the magnesium metal levels and the activator is characterized by the iron metal levels. All results are reported in ppm.

| | Levels of metals (ppm) | P | Mg | Fe |
|---|---|---|---|---|
| 1. | Untreated used TG-740 | 227 | 92 | 525 |
| 2. | Centrifuged | 20 | 0.7 | 17 |
| 3. | Filter (1.5 um) | 3.5 | 0.05 | 2.1 |
| 4. | Filter (1.5 um) + filter (montmorillonite) | 1.6 | 0.05 | 0.3 |
| 5. | Repeat clay addition and step 2 | 0.9 | 0.05 | 0.4 |
| 6. | Step 5 and repeat step 4 | 0.7 | 0.05 | 0.3 |

After step 4, the total removal of gelling agent=99.3%, the total removal of breaker=99.995%, and the total removal of activator=99.995%.

Thus, a process for recycling hydrocarbon fracturing fluid is described. All of the main chemical ingredients (activator, breaker, and gelling agent) used in the hydrocarbon hydraulic stimulation of an oil and gas formation may be reduced by over 99%. This is accomplished by mixing the hydrocarbon fracturing fluid with an aqueous acid, for example phosphoric acid in a concentration between 0.5%-2%. Clay is added, the mixture is centrifuged, and then filtered, resulting in recycled hydrocarbon fracturing fluid that is suitable to reuse.

Immaterial modifications may be made to the processes described here without departing from what is claimed.

The embodiments of the invention in which an exclusive property or privilege is claimed are defined as follows:

1. A method of recycling used hydrocarbon fracturing fluid, the hydrocarbon fracturing fluid comprising a gelling agent including a phosphate ester, the method comprising the steps of:
   contacting the hydrocarbon fracturing fluid with a settling agent including a clay or activated charcoal to separate the gelling agent from the hydrocarbon fracturing fluid, wherein the settling agent comprises a chemical that acts to remove the gelling agent from solution; and
   removing the settling agent and gelling agent from the hydrocarbon fracturing fluid to produce recycled hydrocarbon fracturing fluid.

2. The method of claim 1, in which removing the settling and gelling agents comprises removing the settling agent phase from the hydrocarbon phase.

3. The method of claim 1, wherein removing comprises the steps of:
   centrifuging the mixture of a hydrocarbon phase and a settling agent phase; and
   removing the settling agent phase from the hydrocarbon phase.

4. The method of claim 1, wherein the settling agent comprises a clay.

5. The method of claim 1, wherein the settling agent comprises activated charcoal.

6. The method of claim 1, wherein the gelling agent consist of a phosphate ester.

7. The method of claim 4, wherein the clay is one or more of montmorillonite k10, fulcat 435, fulcat 220, Wyoming gel, zeolite cage T408, diatomaceous earth, salt gel, and natural gel.

8. The method of claim 4, wherein the clay is montmorillonite k10.

9. The method of claim wherein clay is added in an amount by weight of 0.5%-4% of the hydrocarbon fracturing fluid.

10. The method of claim 1, wherein contacting the hydrocarbon fracturing fluid with settling agent further comprises mixing and heating.

11. The method of claim 1, wherein after the contacting step and prior to the removal step, the mixture is allowed to settle for more than eight hours.

12. The method of claim 1, wherein removing comprises filtration.

13. The method of claim 12 wherein the filtration step comprises filtering through a filter having a pore size of less than or equal to 1.5 µm diameter.

14. The method of claim 12, wherein the filtration step comprises filtering through clay.

15. The method of claim 1 the hydrocarbon fracturing fluid further comprising activator and breaker chemicals, and the method further comprising the steps of:
   contacting the hydrocarbon fracturing fluid with an aqueous acid to react the aqueous acid with the activator and breaker chemicals to produce a hydrocarbon fracturing fluid with a hydrocarbon phase and an aqueous phase containing reaction products of the aqueous acid and the activator and breaker chemicals; and
   removing the aqueous phase from the hydrocarbon fracturing fluid.

16. The method of claim 15, further comprising contacting the hydrocarbon fracturing fluid with an amount of aqueous acid that is less than the amount of aqueous acid necessary to cause the hydrocarbon fracturing fluid to form a gel.

17. The method of claim 15, wherein the steps of contacting the hydrocarbon fracturing fluid with an aqueous acid and then removing the aqueous phase from the hydrocarbon fracturing fluid are carried out prior to contacting the hydrocarbon fracturing fluid with clay.

18. The method of claim 15 in which the aqueous acid is one or more of phosphoric acid, ortho-phosphoric acid, pyro-phosphoric acid, hydrochloric acid, sulfuric acid, and sulfamic acid.

19. The method of claim 15 in which the aqueous acid is added at a concentration of between 0.5% and 5% by weight of the hydrocarbon fracturing fluid.

20. The method of claim 15 in which removing the aqueous phase from the hydrocarbon fracturing fluid comprises draining the aqueous phase.

21. A method of recycling used hydrocarbon fracturing fluid, the hydrocarbon fracturing fluid comprising activator, breaker, and gelling agent chemicals, wherein the activator chemical includes an iron or aluminum complex, the breaker chemical includes a metal oxide, and the gelling agent chemical includes a phosphate ester, the method comprising the steps of:
   contacting the hydrocarbon fracturing fluid with an aqueous acid when the pH of the hydrocarbon fracturing fluid is above the pH at which gelling occurs, contacting further comprising using an amount of aqueous acid to react the aqueous acid with the activator and breaker chemicals to produce a hydrocarbon fracturing fluid with a hydrocarbon phase and an aqueous phase containing reaction products of the aqueous acid and the activator and breaker chemicals, contacting further comprising using an amount of aqueous acid that is less than the amount of aqueous acid necessary to cause the hydrocarbon fracturing fluid to form a gel; and
   separating the aqueous phase from the hydrocarbon phase to produce recycled hydrocarbon fracturing fluid.

22. The method of claim 21, wherein separating comprises filtering.

23. The method of claim 22, in which filtering comprises filtering the hydrocarbon fracturing fluid through clay.

24. The method of claim 22, further comprising filtering the hydrocarbon fracturing fluid through a filter having a pore size less than or equal to 1.5 µm in diameter.

25. A method of recycling used hydrocarbon fracturing fluid, the hydrocarbon fracturing fluid comprising a gelling agent including a phosphate ester, the method comprising the steps of:
   contacting the hydrocarbon fracturing fluid with a settling agent including a clay or activated charcoal to react the gelling agent and produce a hydrocarbon fracturing fluid containing a mixture of a hydrocarbon phase and a settling agent phase containing the reaction products of the settling agent and the gelling agent, wherein the settling agent comprises a chemical that acts to remove the gelling agent from solution; and
   removing the settling agent phase from the hydrocarbon phase to produce recycled hydrocarbon fracturing fluid.

26. The method of claim 25, wherein removing comprises the steps of:
   centrifuging the mixture of a hydrocarbon phase and a settling agent phase; and
   removing the settling agent phase from the hydrocarbon phase.

27. The method of claim 25, wherein the settling agent comprises a clay.

28. The method of claim 25, wherein the settling agent comprises activated charcoal.

* * * * *